United States Patent
Takekawa

(10) Patent No.: US 8,029,375 B2
(45) Date of Patent: Oct. 4, 2011

(54) SLIDABLE CONSTANT VELOCITY UNIVERSAL JOINT

(75) Inventor: Yasuaki Takekawa, Mie (JP)

(73) Assignee: NTN Corporation, Osaka (JP)

( * ) Notice: Subject to any disclaimer, the term of this patent is extended or adjusted under 35 U.S.C. 154(b) by 588 days.

(21) Appl. No.: 12/076,417

(22) Filed: Mar. 18, 2008

(65) Prior Publication Data

US 2008/0234057 A1  Sep. 25, 2008

(30) Foreign Application Priority Data

Mar. 20, 2007 (JP) ................................ 2007-073517

(51) Int. Cl.
 *F16D 3/06* (2006.01)
(52) U.S. Cl. ........................................ 464/146; 464/169
(58) Field of Classification Search .................. 464/111, 464/146, 169, 906
See application file for complete search history.

(56) References Cited

U.S. PATENT DOCUMENTS

| | | | |
|---|---|---|---|
| 1,863,244 A | * | 6/1932 | Goddard ................. 464/169 X |
| 3,310,961 A | * | 3/1967 | Ristau ..................... 464/146 |
| 5,356,341 A | * | 10/1994 | Uchman et al. ........... 464/146 |

FOREIGN PATENT DOCUMENTS

| | | |
|---|---|---|
| JP | 61-013029 | 1/1986 |
| JP | 63-030611 | 2/1988 |
| JP | 05-178105 | 7/1993 |
| JP | 2003-300422 | 10/2003 |
| JP | 2005-172142 | 6/2005 |
| JP | 2006-299351 | 11/2006 |
| JP | 2008-115943 | 5/2008 |
| SU | 774637 | * 10/1980 |

* cited by examiner

*Primary Examiner* — Gregory Binda
(74) *Attorney, Agent, or Firm* — Wenderoth, Lind & Ponack, L.L.P.

(57) ABSTRACT

A slidable constant velocity universal joint holds an elastic member (coil spring) in a stable attitude even if an associated shaft makes an oscillating motion, thereby achieving an improvement in terms of stability in torque transmission. The slidable constant velocity universal joint includes an outer joint member connected to a power transmission member, and an inner joint member connected to an end portion of a shaft, with torque transmission being possible between the outer joint member and the inner joint member while allowing angular displacement and axial displacement. At a forward end of the shaft, there is provided an elastic member for elastically urging the outer joint member toward the power transmission member, and, between the elastic member and the forward end of the shaft, there is interposed a bearing member for guiding the forward end of the shaft while in contact therewith.

3 Claims, 8 Drawing Sheets

_page US 8,029,375 B2_

SLIDABLE CONSTANT VELOCITY UNIVERSAL JOINT

BACKGROUND OF THE INVENTION

1. Field of the Invention

The present invention relates to a slidable constant velocity universal joint for use in a power transmission system for automobiles, various industrial machines or the like and, more specifically, to a slidable constant velocity universal joint which is capable of transmitting rotary motion at constant velocity even when driving and driven shafts to be joined together are at an angle (operating angle) with respect to each other and which allows a relative axial movement between driving and driven shafts.

2. Description of the Related Art

As shown in FIG. 5, for example, in the power transmission system of a conventional vehicle such as an agricultural tractor, two power transmission shafts 120 and 130 and both ends of a propeller shaft 150 arranged between them are operationally connected with each other via cross joints 100a and 100b, respectively (see, for example, JP05-178105A and JP2003-300422A). The mounting structure for the cross joints and the power transmission shafts will be described with reference to FIG. 5; in the case of one cross joint 100a (the one on the left-hand side as seen in the drawing), a cylindrical portion 101a with a female spline groove formed therein is fitted onto a spline shaft 121 of the mating power transmission shaft 120 with a male spline groove formed therein, with a bolt 105 being engaged with a recess 122 formed in the outer periphery of the spline shaft 121.

In the case of the other cross joint 100b (the one on the right-hand side as seen in the drawing), a cylindrical portion 101b with a female spline groove formed therein is fitted onto a spline shaft 131 of the mating power transmission shaft 130 with a male spline groove formed therein. That is, the right-hand cross joint 100b is axially slidable with respect to the power transmission shaft 130, whereby, even if the relative position between the two power transmission shafts is changed due to engine vibration or the like, it is possible to absorb any glitch at each connecting portion due to the relative positional deviation. As a result, the fit-engagement between the members is properly maintained, and rotational torque is transmitted in a satisfactory manner.

However, in the conventional example shown in FIG. 5, the right-hand cross joint 100b is fit-engaged with the spline shaft 131 so as to be slidable, so that wear occurs at the fit-engagement portion. Further, the left-hand cross joint 100a has to be fixed to the power transmission shaft 120 by the bolt 105, and the mounting operation involved is problematic.

To solve the above-mentioned problems, a slidable constant velocity universal joint in which, as shown in FIG. 6, coil springs 201 are provided between the ends of a shaft 200 and receiving members 205 arranged inside outer rings 202 has been proposed (see Patent Application No. JP 2008-115943 A). Due to the use of the coil springs 201, the distance between the slidable constant velocity universal joints at both ends is variable, whereby the slidable constant velocity universal joints can be easily mounted to two power transmission members 203 spaced apart from each other by a predetermined interval.

In the slidable constant velocity universal joint shown in FIG. 6, when the shaft 200 assumes an operating angle, cap members 204 provided at the forward ends of the coil springs 201 slide on the receiving members 205 arranged inside the outer rings 202. That is, the coil springs 201 are also inclined in conformity with the shaft 200, so that if the sliding motion of the cap members 204 relative to the receiving members 205 is not effected smoothly, the coil springs 201 may be bent, making it impossible to maintain a stable attitude. This may lead to deterioration in stability in torque transmission.

SUMMARY OF THE INVENTION

In view of the above-mentioned problem, it is an object of the present invention to provide a slidable constant velocity universal joint which keeps an elastic member (coil spring) in a stable attitude even if a shaft makes an oscillating motion to thereby achieve an improvement in terms of stability in torque transmission.

A slidable constant velocity universal joint according to a first aspect of the present invention includes: an outer joint member connected to a power transmission member; and an inner joint member connected to an end portion of a shaft, with torque transmission being possible between the outer joint member and the inner joint member while allowing angular displacement and axial displacement, in which the shaft is provided with, at a forward end thereof, an elastic member for elastically urging the outer joint member toward the power transmission member, and in which the elastic member and the forward end of the shaft are provided with a bearing member interposed therebetween for guiding the forward end of the shaft while in contact therewith.

When the shaft makes an oscillating motion with respect to the power transmission member, the forward end of the shaft is guided by the bearing member while in contact therewith. Thus, the elastic member is scarcely affected by the oscillating motion of the shaft, making it always possible to maintain a stable attitude.

A slidable constant velocity universal joint according to a second aspect of the present invention, in the first aspect of the invention, further includes, a cap member, provided at the forward end of the shaft, having at its forward end a spherical convex surface portion is, in which the bearing member has a spherical concave surface portion for guiding the spherical convex surface portion while in contact therewith.

Since the spherical convex surface portion of the cap member and the spherical concave surface portion of the bearing member are in contact with each other, the contact friction between the members is reduced, thus making it possible to effect smooth sliding. As a result, the influence of the oscillating motion of the shaft on the elastic member can be further mitigated.

A slidable constant velocity universal joint according to a third aspect of the present invention, in the second aspect of the invention, further includes: a flat surface portion formed at the center of the forward end portion of the cap member; and an annular spherical convex surface portion formed around the flat surface portion.

Not the flat surface portion but the annular spherical convex surface portion of the cap member is held in contact with the bearing member. In this way, the cap member and the bearing member can be held in contact with each other in an annular fashion, thereby allowing stable sliding.

According to a slidable constant velocity universal joint of a fourth aspect of the present invention, in the second or third aspect of the invention, the spherical convex surface portion has a radius of curvature set smaller than that of the spherical concave surface portion.

Due to this setting, it is possible to diminish the contact range between the cap member and the bearing member, thereby making it possible to further reduce the contact friction between the members.

According to the present invention, even if the shaft makes an oscillating motion with respect to the power transmission member, the elastic member is scarcely affected by the oscillating motion of the shaft, making it always possible to maintain a stable attitude. Thus, the elastic member (coil spring) is not bent as in the case of the slidable constant velocity universal joint shown in FIG. 6, making it possible to achieve an improvement in terms of stability in torque transmission.

DESCRIPTION OF THE INVENTION

In the following, an embodiment of the present invention will be described with reference to the accompanying drawings.

Figure 8:
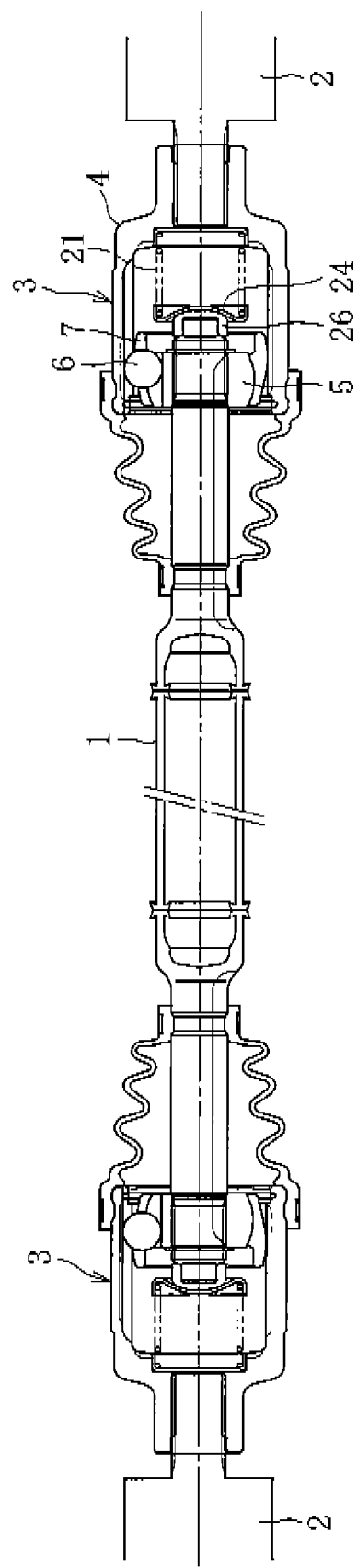
FIG. 8 is a sectional view of a first slidable constant velocity universal joint connected at a first end of a shaft and a second slidable constant velocity universal joint connected at a second end of the shaft.

The present invention relates to a slidable constant velocity universal joint for use in a power transmission system, for example, a propeller shaft, used in a vehicle such as a passenger car or an agricultural tractor, in which both ends of a shaft arranged between two power transmission members, one constituting a driving shaft and the other a driven shaft, are respectively connected to two power transmission members so as to allow an oscillating motion. A pair of slidable constant velocity universal joints connected to both ends of this shaft are of a similar (symmetrical) structure (FIG. 8), so that solely the slidable constant velocity universal joint at one end of the shaft will be described.

Figure 1:
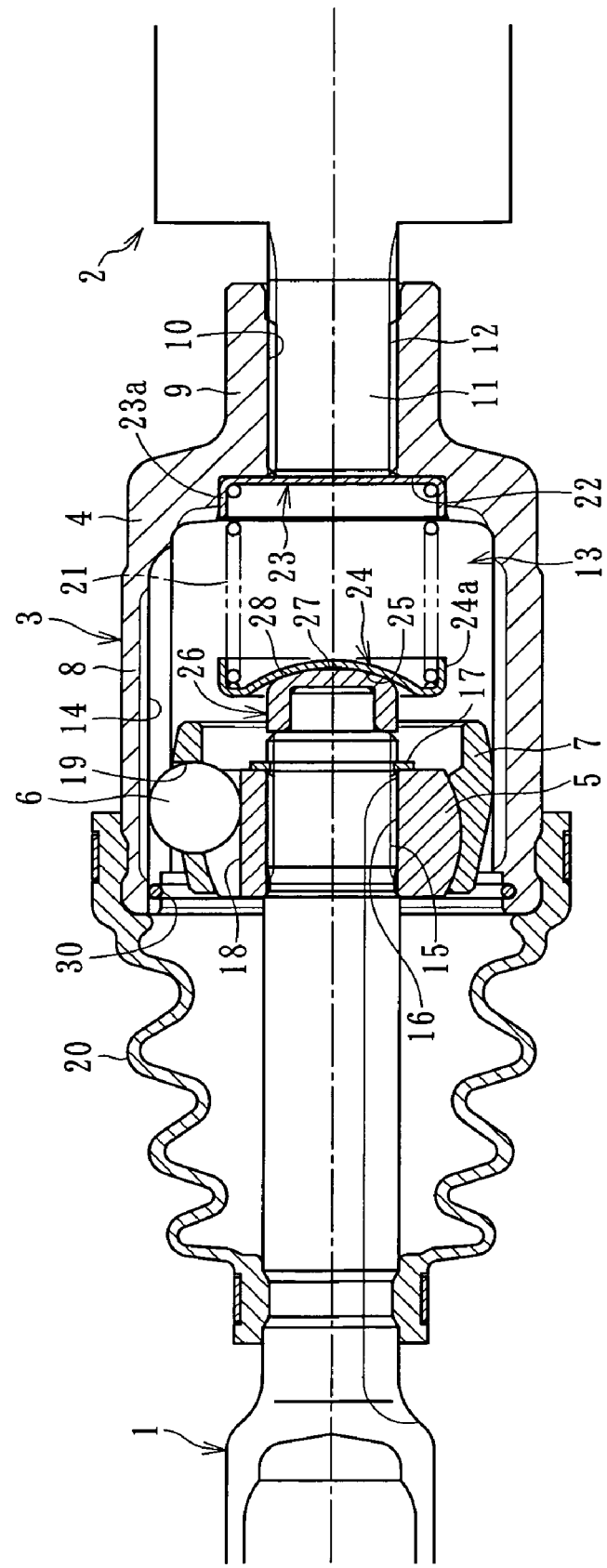
FIG. 1 is a sectional view of a slidable constant velocity universal joint according to an embodiment of the present invention.

As shown in FIG. 1, a slidable constant velocity universal joint according to the present invention is mainly composed of an outer ring 4, an inner ring 5, balls 6 serving as torque transmission members, and a retainer 7.

The outer ring 4 constituting an outer joint member is a member formed by coaxially integrating a large diameter cylindrical portion 8 and a small diameter cylindrical portion 9 with each other. In the inner peripheral surface of the small diameter cylindrical portion 9, there is formed an axially extending female spline groove 10, and, in the outer peripheral surface of a spline shaft 11 of a power transmission member 2, there is formed a male spline groove 12 to be engaged with the female spline groove 10. That is, the power transmission member 2 and the outer ring 4 are axially slidable and detachable with respect to each other.

The large diameter cylindrical portion 8 of the outer ring 4 contains therein an accommodation space 13 capable of accommodating the inner ring 5, the balls 6, the retainer 7, etc., and, in the inner peripheral surface of the large diameter cylindrical portion 8, there are formed a plurality of axially extending ball grooves 14 arranged at equal circumferential intervals. Further, a boot 20 formed of rubber or the like is provided between the open end of the large diameter cylindrical portion 8 and a shaft 1.

The inner ring 5 serving as an inner joint member has in its inner peripheral surface an axially extending female spline groove 16 to be engaged with a male spline groove 15 formed in the outer peripheral surface of the end portion of the shaft 1. And, a retaining ring 17 for preventing detachment of the shaft 1 from the inner ring 5 is attached to a portion in the vicinity of the forward end of the shaft 1 inserted into the inner ring 5.

Further, a plurality of axially extending ball grooves 18 are formed in the outer peripheral surface of the inner ring 5 at equal circumferential intervals, with the ball grooves 18 of the inner ring 5 and the ball grooves 14 of the outer ring 4 being opposed to each other. The opposing ball grooves 14 and 18 of the inner and outer rings 4 and 5 define tracks, in each of which one ball 6 is incorporated so as to be capable of rolling.

The retainer 7 has a plurality of pockets 19 extending therethrough and formed at equal circumferential intervals. The retainer 7 is interposed between the outer ring 4 and the inner ring 5, with each pocket 19 accommodating one ball 6. The inner peripheral surface of the retainer 7 and the outer peripheral surface of the inner ring 5 are in spherical contact with each other, whereby the shaft 1 can assume an operating angle (i.e., make an angular displacement). Further, the balls 6 can roll along the ball grooves 14 of the outer ring 4, so that the balls 6, the shaft 1, the inner ring 5, and the retainer 7 can move integrally in the axial direction (i.e., make an axial displacement) with respect to the outer ring 4. That is, in the slidable constant velocity universal joint, torque transmission is possible between the outer ring 4 and the inner ring 5 while allowing angular displacement and axial displacement.

Further, a retaining ring 30 such as a circlip is attached to the inner peripheral edge of the open end of the outer ring 4, and the retaining ring 30 and the balls 6 interfere with each other, whereby detachment of the inner ring 5, the shaft 1, etc. from the outer ring 4 is prevented.

In the accommodation space 13 of the outer ring 4, there is provided an elastic member 21 capable of expanding and contracting in the axial direction. In FIG. 1, the elastic member 21 is a coil spring. A shallow-plate-like seal plate 23 is fit-engaged with a recess 22 formed in a step surface connecting the inner peripheral surface of the large diameter cylindrical portion 8 of the outer ring 4 and the inner peripheral surface of the small diameter cylindrical portion 9 thereof, and one end of the coil spring 21 is attached to the seal plate 23. Attached to the other end of the coil spring 21 is a shallow-plate-like bearing member 24. The bearing member 24 has a convex spherical configuration protruding toward the seal plate 23. On the shaft 1 side surface of the bearing member 24 thus formed, there is provided a spherical concave surface portion 25. The seal plate 23 and the bearing member 24 have short-cylinder-like edge portions 23a and 24a, respectively. The end portions of the coil spring 21 are respectively retained in the edge portions 23a and 24a, whereby movement of the coil spring 21 in a direction orthogonal to the axis thereof (decentering) is prevented.

A cap member 26 is provided at the forward end of the shaft 1, which is held in contact with the bearing member 24 through the intermediation of the cap member 26. The cap member 26 has at its forward end a flat surface portion 27 formed at the center and an annular spherical convex surface portion 28 formed in the periphery of the flat surface portion 27. From the viewpoint of the ease with which it can be mounted to the shaft 1 and the ease with which it can be shaped, it is desirable for the cap member 26 to be formed of resin.

Figure 7:
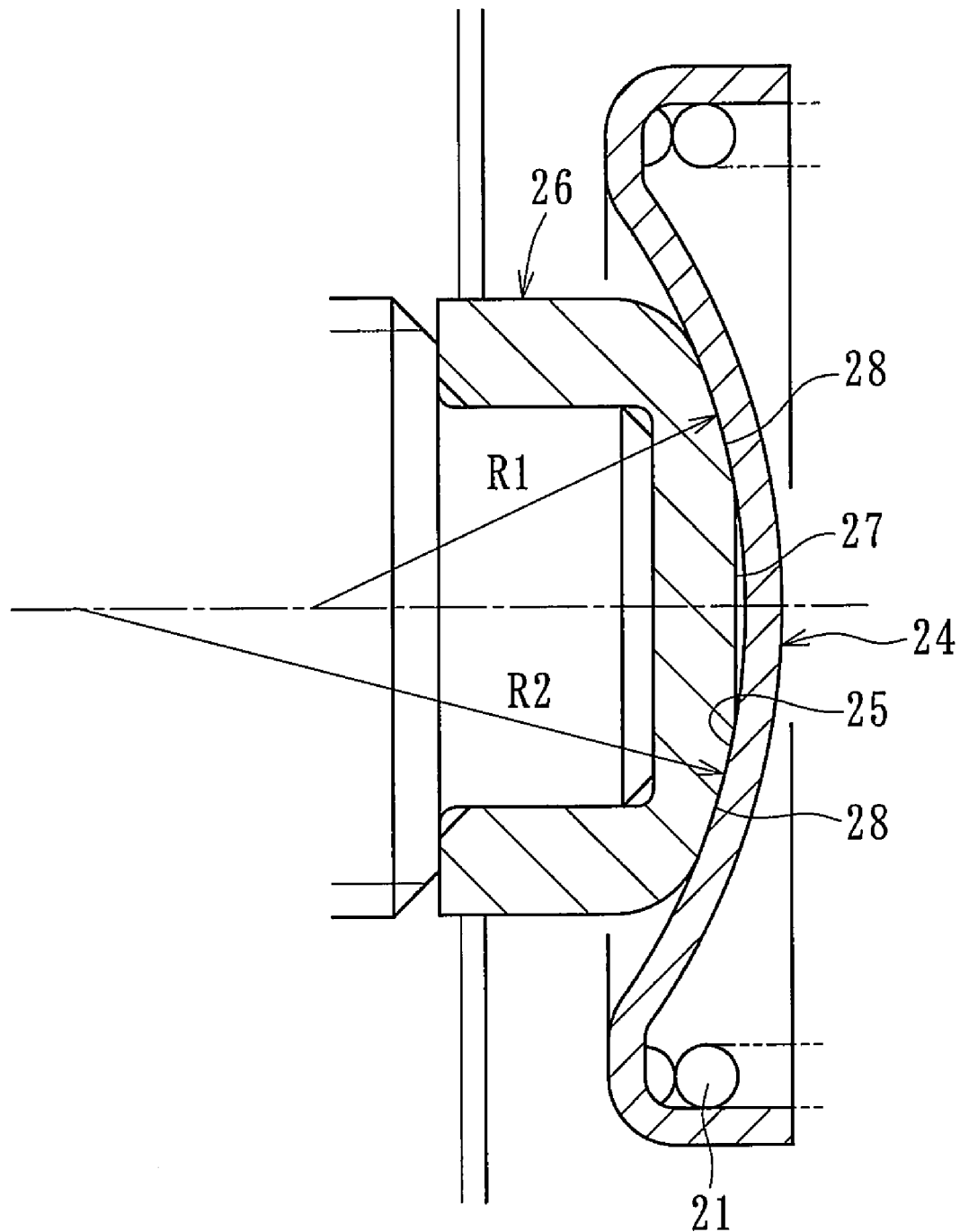
FIG. 7 is an enlarged cross-sectional view of the concave surface portion and the bearing member shown in FIG. 2.

In the state of FIG. 1, the coil spring 21 is compressed in the axial direction, and the cap member 26 and the bearing member 24 are held in press contact with each other by the elastic urging force of the coil spring 21. More specifically, the spherical convex surface portion 28 of the cap member 26 and the spherical concave surface portion 25 of the bearing member 24 are held in contact with each other. The radius of curvature R1 of the spherical convex surface portion 28 is set smaller than the radius of curvature R2 of the spherical concave surface portion 25, so that the spherical convex surface portion 28 and the spherical concave surface portion 25 are held in line contact with each other in an annular fashion (see FIG. 7).

The coil spring 21 is provided within the outer ring 4 in a compressed state. That is, the coil spring 21 is capable of imparting elastic force in both ways in the axial direction over the axial movable range for the balls 6, in other words, over the entire range of the sliding stroke of the slidable constant velocity universal joint 3.

To be described will be a method of mounting the slidable constant velocity universal joints thus provided at both ends of a shaft respectively to two power transmission members spaced apart from each other by a predetermined interval.

Figure 2:
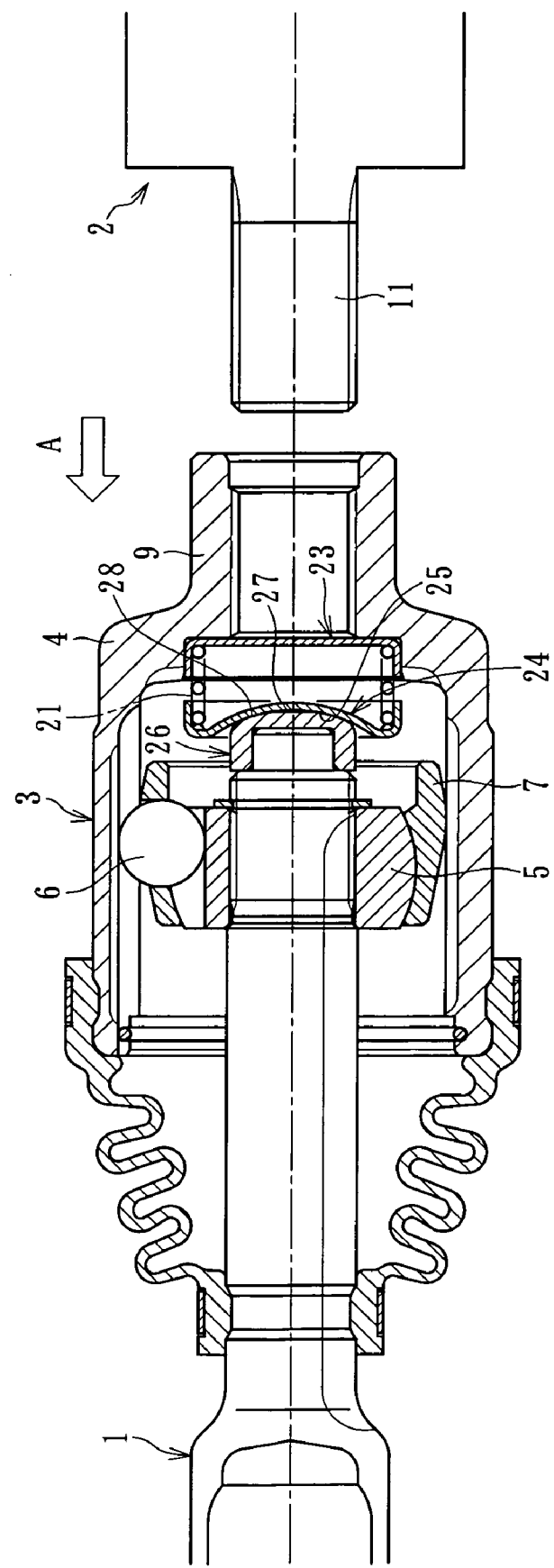
FIG. 2 is a sectional view of the slidable constant velocity universal joint with a coil spring therein compressed.

First, the small diameter cylindrical portion 9 of one slidable constant velocity joint 3 is fitted onto the spline shaft 11 of the mating power transmission member 2 by causing it to slide thereon in the axial direction (see FIG. 1). In this state, the axial distance between the forward end of one slidable constant velocity universal joint 3 and the forward end of the other slidable constant velocity universal joint 3 is larger than the interval dimension between the power transmission members 2. Thus, as shown in FIG. 2, an axial pressurizing force A is imparted to the other slidable constant velocity universal joint 3, bringing the coil springs 21 in both slidable constant velocity universal joints 3 into a compressed state. That is, by compressing the coil springs 21 by imparting the pressurizing force A thereto, the axial distance between the forward ends of the slidable constant velocity universal joints 3 can be made smaller than the interval dimension between the power transmission members 2. And, the small diameter cylindrical portion 9 of the other slidable constant velocity universal joint 3 is fitted onto the spline shaft 11 of the mating power transmission member 2 by causing it to slide axially thereon, whereby the mounting operation is completed.

In the state in which the mounting has been completed, the outer rings 4 of the slidable constant velocity universal joints 3 are pressed against the mating power transmission members 2 by the elastic urging force of the coil spring 21, thereby maintaining the fit-engagement between the slidable constant velocity universal joints 3 and the power transmission members 2. The shaft 1 is held at a position where the opposing elastic forces of the coil springs 21 at both ends thereof are in equilibrium with respect to each other.

The mounting method is not restricted to the above-mentioned one; for example, it is also possible to pressurize the slidable constant velocity universal joints 3 on both sides toward the shaft 1 to shorten them in the axial direction; thereafter, the slidable constant velocity universal joints 3 are successively or simultaneously fitted onto the power transmission members 2.

In detaching the completely mounted slidable constant velocity universal joints 3 from the power transmission members 2, procedures reverse to those for the mounting as described above are to be taken, so a description of the detachment method will be omitted.

Figure 3:
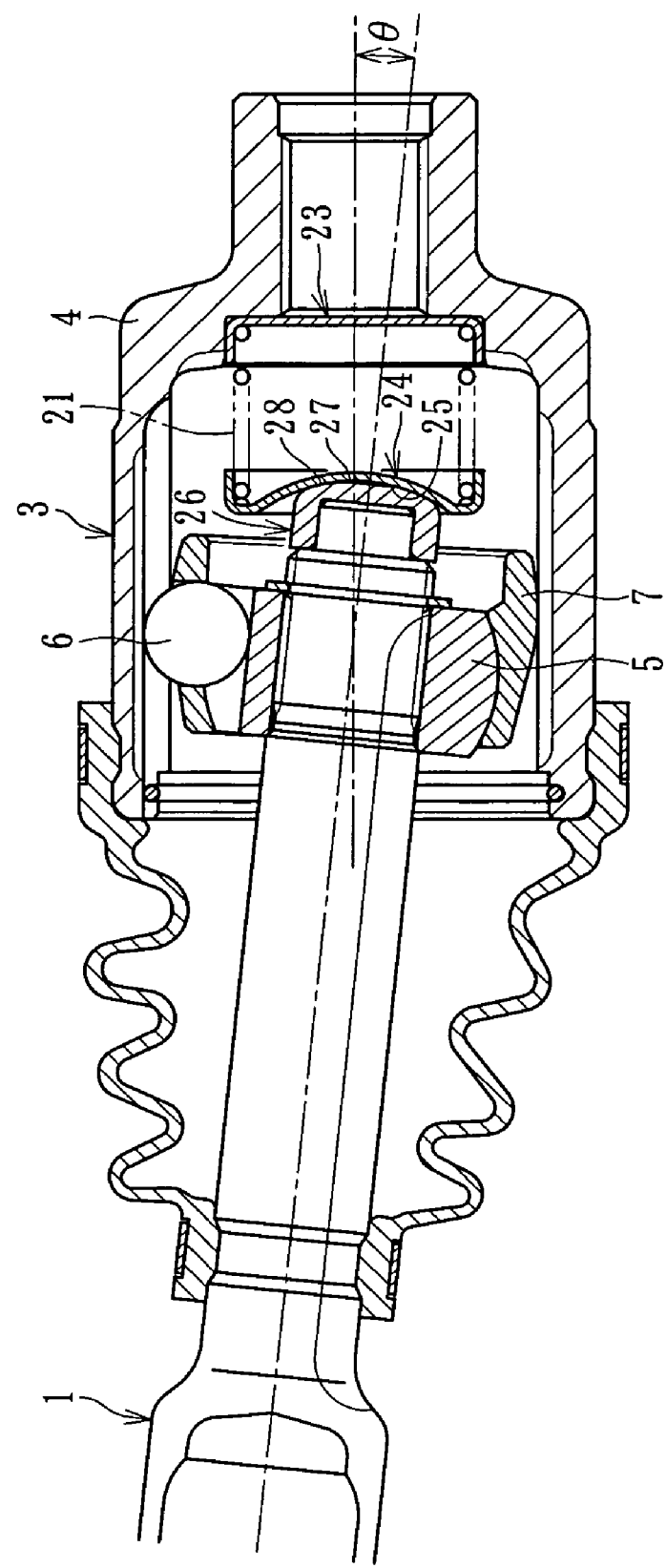
FIG. 3 is a sectional view of the same with a shaft assuming an operating angle.

FIG. 3 shows a state in which the two power transmission members are at an angle (operating angle) with respect to each other, that is, a state in which the shaft 1 assumes an operating angle $\theta$. When transition is effected from the state of FIG. 1, in which the operating angle is 0°, to the state of FIG. 3, in which the operating angle is $\theta$, the cap member 26 at each end of the shaft 1 slides on the spherical concave surface portion 25 of the bearing member 24. The spherical convex surface portion 28 of each cap member 26 is brought into line contact with the spherical concave surface portion 25 in an annular fashion, whereby a smooth and stable sliding movement is effected. On the other hand, each coil spring 21 is arranged so as to be parallel to the axial direction and is held in a stable attitude.

Figure 4:
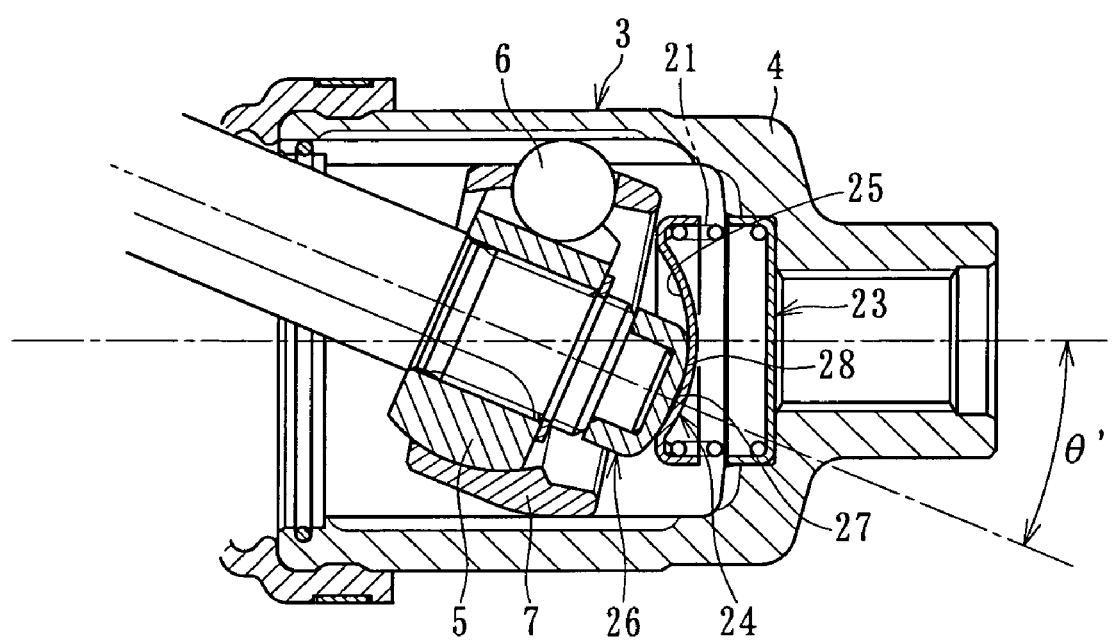
FIG. 4 is a sectional view of the same with the shaft assuming a maximum operating angle.
Figure 5:
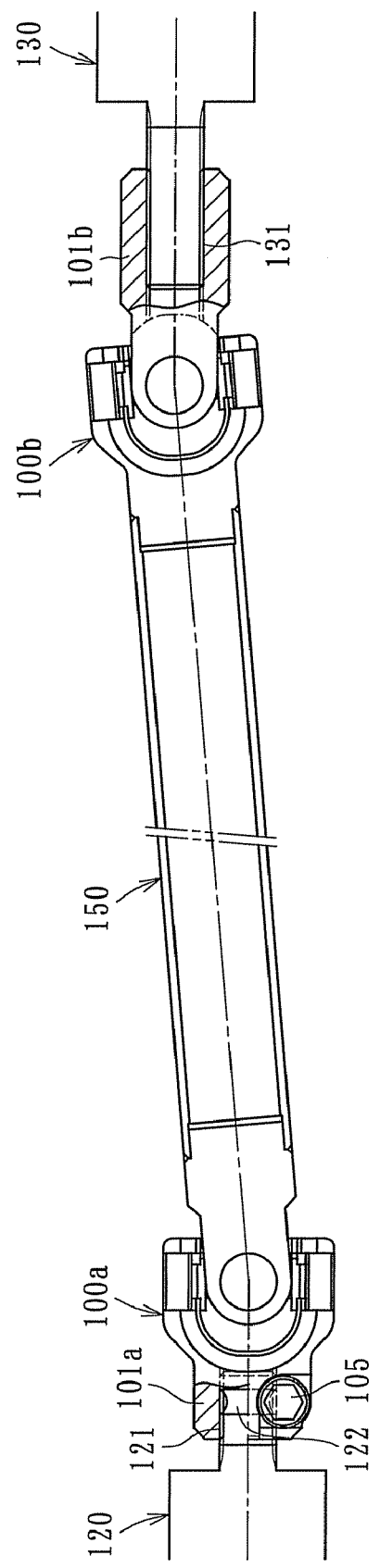
FIG. 5 is a sectional view of a conventional propeller shaft.
Figure 6:
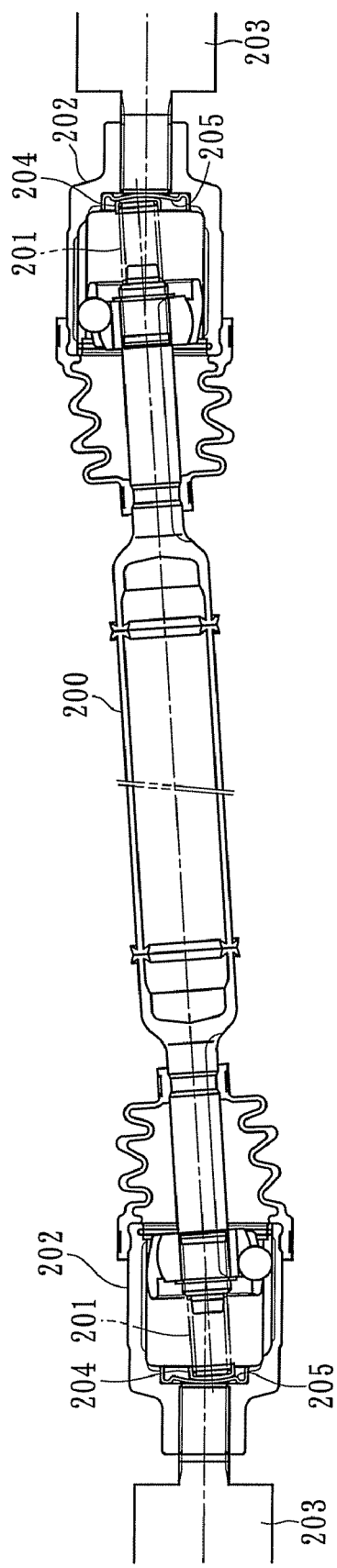
FIG. 6 is a sectional view of a slidable constant velocity universal joint of a comparative example as applied to a propeller shaft.

FIG. 4 shows a case in which the shaft 1 assumes a maximum operating angle $\theta'$, with the spherical convex surface portion 28 of each cap member 26 being in line contact with the spherical concave surface portion 25 of the bearing member 24. In this case also, the coil spring 21 is held parallel to the axial direction and in a stable attitude. In this way, even if the shaft 1 oscillates with respect to the power transmission members 2, each coil spring 21 is always held in a stable attitude, so that it is possible to realize a stable torque transmission. From the viewpoint of keeping them in a stable attitude, it is desirable for the diameter of the coil springs 21 to be relatively large.

The present invention is not restricted to the above-mentioned embodiment but naturally allows various modifications without departing from the gist of the invention. For example, the slidable constant velocity universal joint of the present invention may be connected solely to one end of a shaft instead of connecting the same to both ends thereof. Further, the elastic members may also be members other than coil springs; for example, they may also be bellows-like elastic metal members. Further, the ends of the shaft may be held in direct contact with the bearing members; in this case, it is possible to form a flat surface portion and a spherical convex surface portion at each end of the shaft.

What is claimed is:

1. A slidable constant velocity universal joint, comprising:
   an outer joint member configured to connect to a power transmission member through a female spline and a male spline engaged with each other;
   an inner joint member configured to connect to an end portion of a shaft;
   an elastic member configured to be disposed at an end of the shaft;
   a bearing member disposed so as to be interposed between said elastic member and the end of the shaft;
   a cap member disposed so as to be at the end of the shaft, and having a spherical convex surface portion at a forward end thereof; and
   a flat surface portion disposed at a center of said forward end of said cap member;
   wherein said annular spherical convex surface portion is disposed around said flat surface portion,
   wherein said bearing member has a spherical concave surface portion configured and arranged to guide said spherical convex surface portion while in contact therewith,
   wherein torque transmission is possible between said outer joint member and said inner joint member while allowing angular displacement and axial displacement, wherein said elastic member is configured and arranged so as to elastically urge said outer joint member toward the power transmission member, wherein said bearing member is configured and arranged so as to guide the end of the shaft while being in contact therewith, and wherein said spherical convex surface portion has a radius of curvature smaller than a radius of curvature of said spherical concave surface portion.

2. A power transmission system comprising:

a shaft having a first end and a second end;

a first slidable constant velocity universal joint according to claim 1 connected at said first end of said shaft; and a second slidable constant velocity universal joint according to claim 1 connected at said second end of said shaft.

3. A power transmission system comprising:

a shaft;

a power transmission member; and a slidable constant velocity universal joint according to claim 1, wherein said outer member is connected to said power transmission member, and said inner member is connected to said end portion of said shaft.

* * * * *